(12) United States Patent
Heidenfelder et al.

(10) Patent No.: US 7,638,469 B2
(45) Date of Patent: Dec. 29, 2009

(54) METHODS OF INCREASING PERMEABILITY IN CARBONATIC ROCK FORMATIONS WITH ALKANESULFONIC ACIDS

(75) Inventors: Thomas Heidenfelder, Dannstadt-Schauernheim (DE); Marcus Guzmann, Mühlhausen (DE); Helmut Witteler, Wachenheim (DE); Uwe Ossmer, Neustadt (DE)

(73) Assignee: BASF SE, Ludwigshafen (DE)

( * ) Notice: Subject to any disclaimer, the term of this patent is extended or adjusted under 35 U.S.C. 154(b) by 9 days.

(21) Appl. No.: 11/817,698

(22) PCT Filed: Mar. 3, 2006

(86) PCT No.: PCT/EP2006/060438

§ 371 (c)(1),
(2), (4) Date: Sep. 4, 2007

(87) PCT Pub. No.: WO2006/092438

PCT Pub. Date: Sep. 8, 2006

(65) Prior Publication Data

US 2008/0153718 A1    Jun. 26, 2008

(30) Foreign Application Priority Data

Mar. 4, 2005    (DE) .................. 10 2005 010 564
Sep. 14, 2005   (DE) .................. 10 2005 044 034

(51) Int. Cl.
C09K 8/584    (2006.01)

(52) U.S. Cl. .................. 507/259; 166/307; 166/902; 252/8.555; 252/8.553

(58) Field of Classification Search .................. 507/259
See application file for complete search history.

(56) References Cited

U.S. PATENT DOCUMENTS

| 3,030,311 | A | * | 4/1962 | Oakes | .................. 507/261 |
| 4,332,688 | A | * | 6/1982 | Tate | .................. 507/226 |
| 5,366,643 | A | * | 11/1994 | Walker | .................. 507/247 |
| 6,805,198 | B2 | | 10/2004 | Huang et al. | |
| 2003/0111225 | A1 | | 6/2003 | Huang et al. | |
| 2004/0009880 | A1 | | 1/2004 | Fu | |
| 2005/0016731 | A1 | | 1/2005 | Rae et al. | |

FOREIGN PATENT DOCUMENTS

| EP | 0656417 A1 | 6/1995 |
| GB | 2110744 | 6/1983 |
| WO | WO-95/14641 A1 | 6/1995 |

OTHER PUBLICATIONS

Ullmann's Encyclopedia of Industrial Chemistry, vol. 24, Sixth Edition, pp. 184-188.

* cited by examiner

*Primary Examiner*—Timothy J. Kugel
*Assistant Examiner*—Atnaf Admasu
(74) *Attorney, Agent, or Firm*—Connolly Bove Lodge & Hutz LLP

(57) ABSTRACT

Methods of increasing permeability in a carbonatic rock formation, the methods comprising: providing an alkanesulfonic acid; and introducing the alkanesulfonic acid into the carbonatic rock formation.

20 Claims, 1 Drawing Sheet

Dissolution of CaCO₃ with a mixture of amidosulfonic acid and methanesulfonic acid.

METHODS OF INCREASING PERMEABILITY IN CARBONATIC ROCK FORMATIONS WITH ALKANESULFONIC ACIDS

CROSS-REFERENCE TO RELATED APPLICATIONS

This application is a national stage application, under 35 U.S.C. §371, of PCT/EP2006/060438, filed Mar. 3, 2006, which claims priority of German Application No. 10 2005 010 564.5, filed Mar. 4, 2005, and German Application No. 10 2005 044 034.7, filed Sep. 14, 2005.

BACKGROUND OF THE INVENTION

The invention relates to the use of alkanesulfonic acids for increasing the permeability of underground, carbonatic mineral oil- and/or natural gas-carrying rock formations and for dissolving carbonatic and/or carbonate-containing impurities in mineral oil production, in particular at a temperature of at least 100° C.

In mineral oil or natural gas recovery, mineral oil- and/or natural gas-carrying rock formations are drilled. Typical rock formations comprise sandstone formations and/or carbonate formations. In the case of sandstone formations, the quartz particles are caked together by other materials, including carbonates. Of course, carbonatic formations, too, may have a certain quartz content or silicate content.

Owing to the difference between the pressure in the formation and the pressure in the well, the mineral oil or natural gas flows through fine channels, pores or the like in the formation to the well and is conveyed from there to the surface. The pressure in the formation may be of natural origin or may be artificially maintained, for example, by forcing in water, steam or other liquid or gaseous media through an injection well.

In order to ensure an economical production rate for mineral oil and natural gas, the porosity of the rock formation must reach a certain degree. Frequently, however, the porosity of the rock formation is too low. On the one hand, the natural porosity may already be too low; on the other hand, however, pores which are sufficiently large per se may become blocked with particles, for example rock particles, in the course of time. It is therefore known that the rock formation can be hydraulically disintegrated for creating pores and channels (also referred to as "fracturing treatment" or "fracturing").

Blockages may form in particular through $CaCO_3$ or $BaCO_3$. In the rock formation, a higher concentration of calcium carbonate is dissolved in the formation water under the naturally occurring conditions (high pressure, high temperature) than under normal conditions (1 bar, room temperature). If formation water saturated with $CaCO_3$ enters zones of low temperature and/or relatively low pressure, the $CaCO_3$ or $BaCO_3$ crystallizes out. This is the case, for example, in the vicinity of the production well. As a result, the porosity of the formation is reduced.

Furthermore, the formation water cools on the way to the Earth's surface, with a result that $CaCO_3$ deposits or $BaCO_3$ deposits also form in the well itself. Also as a result of this, the productivity of oil or gas production is reduced.

It is known that such blockages in the well or in the formation can be eliminated by an acid treatment (also referred to as "acidizing treatment" or "acidizing"). Furthermore, new channels or pores can also be created in the formation by an acidizing treatment. Further details in this context are described, for example, in Ullmann's Encyclopedia of Industrial Chemistry, 6th Edt., 2000 Electronic Release, "Resources of Oil and Gas, 3.4.2. General Production Engineering".

For example, aqueous solutions of HF and/or HCl are used as acids for the acidizing treatment. HF is of course suitable here for silicate formations, and HCl is used in particular for carbonatic formations. However, the use of organic acids has also been disclosed.

US 2005/16731 discloses a method for dissolving silicate material in a sandstone formation of a mineral oil deposit, in which a buffered solution of an organic acid is first forced into the formation and a solution comprising HF is forced in only in a second step. The organic acid may be, for example, formic acid, acetic acid or citric acid.

US 2004/9880 discloses a mixture for the treatment of sandstone formations which comprises water, an acid-hydrolyzable surface-active substance, an inorganic acid, for example HCl, and an organic acid. The inorganic acid may be, for example, hydrochloric acid, sulfuric acid or nitric acid, and the organic acid may be, for example, formic acid, acetic acid, citric acid or methanesulfonic acid. The treatment of carbonatic rock formations is not disclosed.

Owing to the high vapor pressure, HCl is not suitable for use at relatively high temperatures. Moreover, HCl is highly corrosive, particularly at relatively high temperatures.

U.S. Pat. No. 6,805,198 discloses a method for increasing the permeability of underground rock formations at relatively high temperatures, in particular from 92° C. to 204° C., with the use of organic dicarboxylic acids, such as, for example, oxalic acid, malonic acid or adipic acids. However, formation of undesired precipitates, for example of calcium oxalate, may occur here. Furthermore, relatively large amounts of the comparatively weak acids are required.

WO 95/14641 discloses alkanesulfonic acids, optionally as a mixture with other acids, such as, for example, amidosulfonic acid, for removing lime deposits, in particular in the household.

BRIEF SUMMARY OF THE INVENTION

It was an object of the invention to provide an improved method for increasing the permeability of carbonatic or carbonate-containing formations, which can be used in particular at relatively high temperatures. Furthermore, it was an object of the invention to provide a method for eliminating carbonate-containing deposits and blockages, regardless of the type of surrounding formation.

Accordingly, the use of alkanesulfonic acids, preferably methanesulfonic acid, for increasing the permeability of underground, carbonatic mineral oil- and/or natural gas-carrying rock formations was found.

In a second aspect of the invention, the use of water-soluble alkanesulfonic acids for dissolving carbonatic and/or carbonate-containing impurities in mineral oil production was found.

In a third aspect of the invention, a method for increasing for increasing the permeability of underground, carbonatic mineral oil- and/or natural gas-carrying rock formations was found, in which alkanesulfonic acids or a formulation comprising alkanesulfonic acids are or is forced through at least one well into the rock formation.

In a preferred embodiment of the invention, said formations are rock formations having a temperature of at least 100° C.

BRIEF DESCRIPTION OF THE SEVERAL VIEWS OF THE DRAWING

The foregoing summary, as well as the following detailed description of the invention, may be better understood when read in conjunction with the appended drawings. For the purpose of assisting in the explanation of the invention, there are shown in the drawings representative embodiments which are considered illustrative. It should be understood, however, that the invention is not limited in any manner to the precise arrangements and instrumentalities shown.

In the drawings.

DETAILED DESCRIPTION OF THE INVENTION

Figure 1:
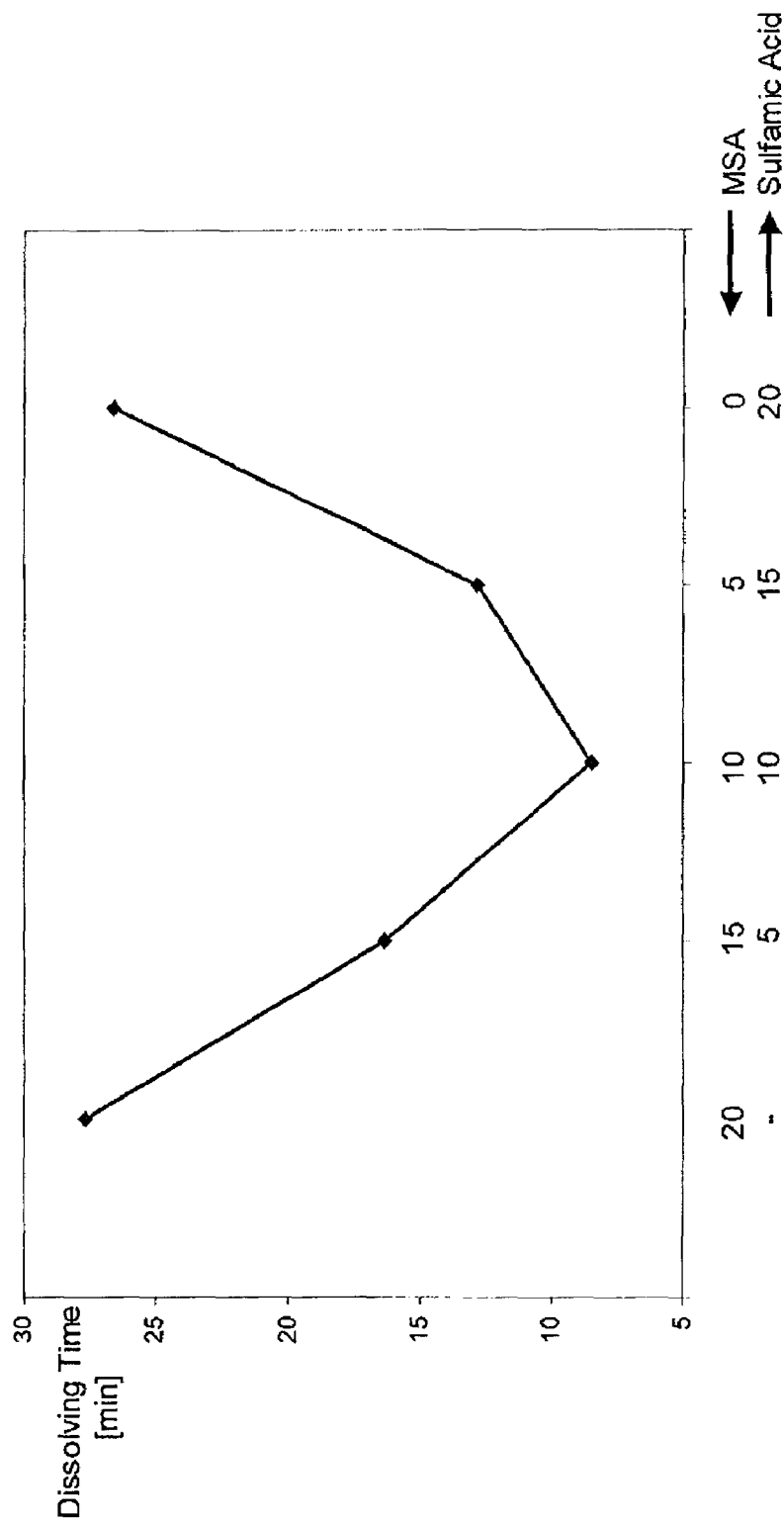
FIG. 1 is a line graph of $CaCO_3$ dissolution time.

Regarding the invention, the following may be stated specifically.

The term "carbonatic rock formation" is known in principle to the person skilled in the art. Carbonatic rock formations substantially comprise $CaCO_3$ and/or $MgCO_3$, for example in the form of magnesite, dolomite, limestone, chalk or aragonite. Further carbonates, such as, for example, $SrCO_3$ or $BaCO_3$, can of course also be present. The rock formations can of course also comprise impurities or can be mixed with other rock formations, for example silicate formations.

The term "carbonatic rock formation" is also intended to comprise carbonate-containing rock formations in which other minerals form the main constituent but which comprise at least small amounts of carbonates, in particular $CaCO_3$ and/or $MgCO_3$, frequently in amorphous or poorly cystallized forms. Carbonate-containing rock formations comprise, as a rule, at least 1% by weight, preferably at least 2% by weight, particularly preferably at least 5% by weight and very particularly preferably at least 10% by weight of carbonates, based in each case on the sum of all components. Silicate formations in which silicate and/or quartz particles may be caked together by means of carbonate may be mentioned as an example.

"Carbonatic and/or carbonate-containing impurities in mineral oil production" are undesired deposits of those materials which may occur in all stages of mineral oil production from the formation to the mineral oil filling installations. These may be, for example, impurities in the rock formation. They may also be carbonatic deposits on the formation surface. Such impurities are, for example, filter cakes of $CaCO_3$, which form during the drilling process and have to be removed again after the drilling process. Carbonatic deposits may also form when the formation is damaged by unforeseen penetration of drilling fluids comprising calcium carbonate. They may also be carbonatic deposits on the formation surface which are formed as a result of precipitation (caused by pressure or temperature reduction) from the aqueous phase within the formation. These formations need not be carbonatic formations but may also be, for example, silicate formations.

Carbonatic and/or carbonate-containing impurities may also form outside the formation in the course of the mineral oil production. In particular, wells, for example injection wells or production wells, installations at the mineral oil production site, such as, for example, water/oil separation units, mineral oil pipelines or the like, may be mentioned here.

According to the invention, water-soluble alkanesulfonic acids are used. Of course, mixtures of different alkanesulfonic acids may also be used. Alkanesulfonic acids have the general formula $R^1$—$SO_3H$, where $R^1$ is a straight-chain, branched or cyclic alkyl radical. The person skilled in the art chooses the radical with the proviso that the alkanesulfonic acid should still have sufficient solubility in water. This also depends of course on the concentration intended for the respective application. As a rule, $R^1$ is a straight-chain or branched $C_1$- to $C_6$-alkyl radical, preferably a $C_1$- to $C_4$-alkyl radical.

Methanesulfonic acid (abbreviated to MSA, formula: $CH_3$—$SO_3H$) is particularly preferably used for the procedure. Methanesulfonic acid is a very strong acid ($pK_a$: −2) but, in contrast to HCl or formic acid, has only a low vapor pressure. It is therefore very particularly suitable also for use at relatively high temperatures. Methanesulfonic acid can advantageously be used for the treatment of rock formations having a temperature of at least 60° C., in particular from 60 to 250° C. The temperature of the rock formation to be treated is preferably from 100 to 240° C., particularly preferably from 120 to 230° C., very particularly preferably from 140 to 220° C. and, for example, from 160 to 220° C. It can of course also be used at lower temperatures, for example a temperature from 20° C.

Pure 100% strength MSA may be used. Preferably, however, an acidic, aqueous solution or formulation of MSA is used. The solvent is preferably water, but small amounts of organic, water-miscible solvents may also be present. These may be, in particular, alcohols, for example methanol, ethanol or propanol. As a rule, the proportion of water is at least 80% by weight, preferably 90% by weight and particularly preferably at least 95% by weight, based in each case on the total amount of all solvents used.

The concentration of MSA in the solution or formulation is chosen by the person skilled in the art according to the desired use. However, a concentration of at least 5% by weight, preferably at least 10% by weight, particularly preferably at least 20% by weight and very particularly preferably at least 50% by weight, based in each case on the sum of all components of the solution or formulation, has proven useful. For example, the concentration may be from 65 to 75% by weight.

According to the invention, MSA can particularly advantageously be used as the only acid. However, it is of course also possible to use it in combination with other acids. However, readily volatile acids should be dispensed with, in particular at high application temperatures. In particular a formulation used according to the invention should comprise no HCl and/or HF or HF precursor at application temperatures greater than 150° C. Examples of further acids also comprise organic acids, such as, for example, p-toluenesulfonic acid.

Preferred acid combinations comprise synergistic mixtures of alkanesulfonic acids, in particular MSA with sulfuric acid derivatives.

A combination of MSA with amidosulfonic acid $H_2N$—$SO_3H$ is particularly preferred. Surprisingly, it was found that mixtures of MSA and amidosulfonic acid lead to accelerated dissolution of $CaCO_3$. Here, the MSA/amidosulfonic acid ratio should as a rule be from 50:1 to 1:50, preferably from 10:1 to 1:10, particularly preferably from 5:1 to 1.3 and very particularly preferably from 4:1 to 1:1.

In a further, preferred embodiment of the invention, the acid may be used in combination with at least one water-soluble corrosion inhibitor. The person skilled in the art is familiar with corrosion inhibitors and makes a suitable choice according to the desired use. Of course, mixtures of different corrosion inhibitors may also be used. The content of corrosion inhibitors is chosen by the person skilled in the art according to the desired use.

Examples of suitable water-soluble corrosion inhibitors comprise alkyne derivatives, for example propargyl alcohol or 1,4-butynediol.

In a preferred embodiment of the invention, said derivatives are alkoxylated alkyne derivatives of the general formula

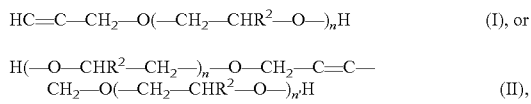

$$HC \equiv C-CH_2-O(-CH_2-CHR^2-O-)_nH \quad (I), \text{ or}$$

$$H(-O-CHR^2-CH_2-)_{n'}-O-CH_2-C \equiv C-CH_2-O(-CH_2-CHR^2-O-)_nH \quad (II),$$

where the radicals $R^2$, in each case independently of one another, are H or methyl and the indices n and n', independently of one another, are from 1 to 10. It is known to the person skilled in the art that such alkoxy groups are obtainable in particular by oxyalkylation or starting from industrial polyglycols. Said values for n are thus average chain lengths, and the average value need not of course be a natural number but may also be any desired rational number. n and n' are preferably a number from 1 to 3.

The alkyleneoxy groups may be exclusively groups derived from ethylene oxide units or exclusively groups derived from propylene oxide. However, they may of course also be groups which have both ethylene oxide units and propylene oxide units. Polyoxyethylene units are preferred.

Further preferred corrosion inhibitors for carrying out the present invention are polymeric corrosion inhibitors. These are, in particular, water-soluble or water-dispersible, substantially uncrosslinked homo- or copolymers which comprise at least 50% by weight of (meth)acrylic acid units. The polymers moreover preferably comprise further acidic monomers differing from (meth)acrylic acid.

In particular they may be water-soluble or at least water-dispersible polymers which are composed of the following components:
(A) from 50 to 99.9% by weight of (meth)acrylic acid,
(B) from 0.1 to 50% by weight of at least one further ethylenically unsaturated monomer which differs from (meth)acrylic acid and has at least one acidic group, and
(C) from 0 to 30% by weight of other ethylenically unsaturated comonomers which are copolymerizable with (A) and (B).

The stated amounts are based in each case on the total amount of all constituents of the polymer. The amounts of (A) are preferably from 50 to 90% by weight, those of (B) from 10 to 50% by weight and those of (C) from 0 to 20% by weight.

The comonomers (B) must be copolymerizable with (meth)acrylic acid and, if appropriate, further comonomers. The acidic groups may likewise be carboxylate groups but can also be other acidic groups, such as, for example, phosphoric acid, phosphonic acid or sulfonic acid groups. The comonomers may each have only identical or different acidic groups. Of course, a plurality of different comonomers (B) having acidic groups may also be used.

Examples of comonomers (B) comprise acids having COOH groups and of the general formula $R^3HC=CH-(CH_2)_n-COOH$, where n=1 to 8 and $R^3$=H or $C_1$ to $C_3$, such as, for example, vinylacetic acid, crotonic acid or isocrotonic acid, unsaturated acids having two COOH groups, such as maleic acid or fumaric acid, acids having phosphonic acid groups, such as vinylphosphonic acid, allylphosphonic acid or 3-butenylphosphonic acid, acids having phosphoric acid groups, such as monovinyl phosphate, monoallyl phosphate, mono-3-butenyl phosphate or phosphonoxyethyl(meth)acrylate, or acids having sulfonic acid groups, such as styrenesulfonic acid. Examples of particularly suitable comonomers (B) comprise maleic acid, fumaric acid and vinylphosphonic acid.

The comonomers (C) comprise an ethylenically unsaturated group but do not comprise any acidic groups. Examples of such monomers comprise olefins, such as ethylene, propylene or styrene, esters of vinyl alcohol and monocarboxylic acids, in particular vinyl acetate or vinyl propionate, and furthermore in particular (meth)acrylates having a very wide range of alcohol radicals, such as methyl(meth)acrylate, ethyl (meth)acrylate, n-butyl(meth)acrylate or 2-ethylhexyl(meth) acrylate. They may furthermore be monomers having OH groups such as, for example, p-vinylphenol or in particular ethoxylated or propoxylated (meth)acrylic acid.

Polymers of said type and their preparation are described in detail, for example, in WO 04/74372, page 3 to page 18.

The formulation can of course also comprise conventional additives and assistants which are typical for an acidizing treatment of oil- or gas-carrying rock formations. Examples of such assistants comprise, for example, polymers for increasing the viscosity, surfactants, foam formers or foam breakers, oxidizing agents, enzymes, assistants for reducing the friction or for controlling paraffin precipitations and biocides. In addition, complexing agents, such as, nitrilotriacetic acid (NTA), ethylenediaminetetraacetic acid (EDTA), diethylenetriaminepentaacetic acid (DTPA), hydroxyethylethylenediaminetriacetic acid (HEDTA) or methylglycenediacetic acid (MGDA), can preferably be used as assistants. The content of additives is chosen by the person skilled in the art according to the desired use.

For carrying out the method according to the invention, the acidic formulation is forced in a manner known in principle through at least one well into the rock formation. This may be a production well or an injection well. In the case of the production well, it is a well through which mineral oil or natural gas is also withdrawn. The injection well serves for forcing in flooding media for maintaining the pressure in the deposit. A treatment of the injection well reduces pressure drops when the flooding medium is forced in and thus also advantageously contributes to higher productivity.

In the case of the acidizing treatment, carbonatic and/or carbonate-containing impurities are dissolved and/or new channels or pores are also formed in the formation.

If only impurities in a production and/or injection well are to be dissolved, it is sufficient to treat the well with the acidic formulation.

The action time is determined by the person skilled in the art according to the local circumstances at the respective drilling site. It is, for example, dependent on the type of formation or on the deposits and/or impurities to be removed and on the concentration of the acid. The action time may be from a few minutes to several days.

The acidizing treatment according to the invention can also advantageously be combined with a hydraulic fracturing of the formation. Here, fracturing of the formation by means of any desired flooding medium, for example water, can first be carried out. Hydraulic fracturing can, however, also be carried out with the acidic formulation itself which is used according to the invention. Whether a simple acidizing treatment without hydraulic fracturing of the formation or a combined fracturing/acidizing treatment is effected can be determined by the person skilled in the art in a manner known in principle and by the choice of the pressure at which the acidic formulation is forced into the formation.

The following examples are intended to explain the invention in more detail:

EXAMPLE 1

Dissolution Rate for $CaCO_3$ 10 ml of acid were added to 240 ml of a 0.104 molar $CaCO_3$ suspension under the conditions stated in table 1, and the time to complete dissolution of the $CaCO_3$ was measured. The respective acids were used in an equimolar ratio. The values were determined in each case with and without stirring. The data are listed in table 1.

TABLE 1

Dissolution rate for $CaCO_3$ [data in minutes]

| Acid | Amount [% by weight] in water | Dissolution time [min] without stirring | with stirring | Relative dissolution time [MSA = 100%] without stirring | with stirring |
|---|---|---|---|---|---|
| Temperature: 23° C. | | | | | |
| MSA | 70 | 1086 | 23.2 | 100% | 100% |
| HCl | 26.5 | 1058 | 36.0 | 97.4% | 155% |
| HCOOH | 33.5 | >5760 | 47.3 | >530% | 204% |
| Temperature: 40° C. | | | | | |
| MSA | 70 | 162 | 11.7 | 100% | 100% |
| HCl | 26.5 | 239 | 33.3 | 148% | 285% |
| HCOOH | 33.5 | >540 | 28.1 | >333% | 240% |
| Temperature: 68° C. | | | | | |
| MSA | 70 | 57 | 4.5 | 100% | 100% |
| HCl | 26.5 | 81 | 13.1 | 142% | 291% |
| HCOOH | 33.5 | 378 | 37.2 | 663% | 827% |

EXAMPLE 2

Comparison Between the Corrosion Rates of Hydrochloric and Methanesulfonic Acid The corrosion rate was determined by the action of acid on a steel test specimen. The test specimen used was steel having the maternal number 1.0425.

The material removed per unit area was determined by weighing before and after the action of the acid (cf. table 2):

TABLE 2

Corrosion rate of steel in HCl and MSA (90 min, 75° C.)

| Acid | Material removed [g/cm$^2$] |
|---|---|
| HCl [26.55] | 1.60 |
| MSA [70.00] | 0.08 |

EXAMPLE 3

Corrosion Rates of Hydrochloric and Methanesulfonic Acid in the Presence of Inhibitors The following inhibitors were used for the tests:

| Type | Description |
|---|---|
| A | Modified polyacrylic acid |
| B | Copolymer based on maleic acid/acrylic acid/vinylphosphonic acid |
| C | Propargyl alcohol |
| D | Propargyl alcohol alkoxylated |

The corrosion rates were determined as described in example 2. The results are listed in each case in tables 3 and 4.

TABLE 3

Corrosion rate of steel in MSA/HCl in the presence of inhibitors (60 min, 75° C.)

| Acid | Inhibitor | Concentration | g/cm$^2$ |
|---|---|---|---|
| HCl 26.5% | none | — | 1.325 |
| HCl 26.5% | A | 1% | 1.263 |
| HCl 26.5% | B | 1% | 1.083 |
| HCl 26.5% | C | 1% | 0.003 |
| HCl 26.5% | D | 1% | 0.001 |
| MSA 70% | none | — | 0.073 |
| MSA 70% | B | 1% | 0.048 |
| MSA 70% | A | 1% | 0.040 |
| MSA 70% | D | 1% | 0.003 |
| MSA 70% | C | 1% | 0.002 |

TABLE 4

Corrosion rate of steel in MSA/HCl in the presence of inhibitors (180 min, 75° C.)

| Acid | Inhibitor | Concentration | g/cm$^2$ |
|---|---|---|---|
| HCl 26.5% | — | | a) |
| MSA 70% | — | | 0.137 |
| HCl 26.5% | A | 0.5% | a) |
| MSA 70% | A | 0.5% | 0.132 |
| HCl 26.5% | D | 0.67% | a) |
| MSA 70% | D | 0.67% | 0.005 |
| HCl 26.5% | B | 0.5% | a) |
| MSA 70% | B | 0.5% | 0.098 | a) Test specimen was completely dissolved in the reaction medium

EXAMPLE 4

Synergistic Effect Between Methanesulfonic Acid and Amidosulfonic Acid 35 ml of the acid mixture mentioned in table 5 were added to 215 ml of a $CaCO_3$ suspension (0.104 mol/l) at a temperature of 68° C., and the time to complete dissolution of the $CaCO_3$ was measured. The results are listed in table 5 and shown graphically in FIG. 1.

TABLE 5

Time for dissolution of $CaCO_3$ of a mixture of amidosulfonic acid and methanesulfonic acid.

| MSA [% by weight] in water | Amidosulfonic acid [% by weight] in water | Dissolution time [min] |
|---|---|---|
| 20 | 0 | 27.65 |
| 15 | 5 | 16.35 |
| 10 | 10 | 8.5 |

TABLE 5-continued

Time for dissolution of CaCO₃ of a mixture of amidosulfonic acid and methanesulfonic acid.

| MSA [% by weight] in water | Amidosulfonic acid [% by weight] in water | Dissolution time [min] |
| --- | --- | --- |
| 5 | 15 | 12.85 |
| 0 | 20 | 26.58 |

The results of the examples and comparative examples show that MSA has substantially better properties in the dissolution of carbonatic materials at relatively high temperatures than HCl or HCOOH. While the differences at room temperature are not yet so pronounced, the differences at 68° C., i.e. typical temperatures of rock formations, are very pronounced. Owing to the more rapid dissolution, the mineral oil production then also need not be interrupted for such a long time for an acidizing treatment.

On prolonged action of hydrochloric acid, the corrosion cannot be stopped even with addition of corrosion inhibitors. Methanesulfonic acid is also substantially less corrosive than hydrochloric acid even without inhibitors, although it is a strong acid. By adding only small amounts of inhibitor, the corrosion can be virtually completely suppressed.

We claim:

1. A method of increasing permeability in a carbonatic rock formation, the method comprising: providing an alkanesulfonic acid; and introducing the alkanesulfonic acid into the carbonatic rock formation.

2. The method according to claim 1, wherein introducing the alkanesulfonic acid into the carbonatic rock formation comprises forcing the alkanesulfonic acid though at least one well into the carbonatic rock formation.

3. The method according to claim 2, wherein the at least one well comprises a production well.

4. The method according to claim 2, wherein the at least one well comprises an injection well.

5. The method according to claim 1, wherein an area of the carbonatic rock formation into which the alkanesulfonic acid is introduced is at least 100° C.

6. The method according to claim 2, wherein an area of the carbonatic rock formation into which the alkanesulfonic acid is introduced is at least 100° C.

7. The method according to claim 1, wherein the alkanesulfonic acid is introduced into the carbonatic rock formation as an aqueous solution wherein the content of the alkanesulfonic acid in the solution is at least 20% by weight.

8. The method according to claim 2, wherein the alkanesulfonic acid is introduced into the carbonatic rock formation as an aqueous solution wherein the content of the alkanesulfonic acid in the solution is at least 20% by weight.

9. The method according to claim 5, wherein the alkanesulfonic acid is introduced into the carbonatic rock formation as an aqueous solution wherein the content of the alkanesulfonic acid in the solution is at least 20% by weight.

10. The method according to claim 1, wherein the alkanesulfonic acid is introduced into the carbonatic rock formation as a mixture with at least one corrosion inhibitor.

11. The method according to claim 9, wherein the alkanesulfonic acid is introduced into the carbonatic rock formation as a mixture with at least one corrosion inhibitor.

12. The method according to claim 10, wherein the corrosion inhibitor comprises an alkoxylated alkyne derivative selected from the group consisting of compounds of the general formula (I), compounds of the general formula (II), and mixtures thereof,

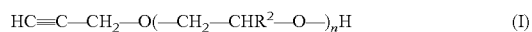

$$HC\equiv C-CH_2-O(-CH_2-CHR^2-O-)_nH \qquad (I)$$

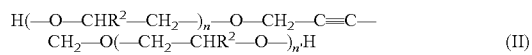

$$H(-O-CHR^2-CH_2-)_{n'}-O-CH_2-C\equiv C-CH_2-O(-CH_2-CHR^2-O-)_nH \qquad (II)$$

wherein each $R^2$ independently represents H or methyl; and wherein n and n' each independently represents a number of 1 to 10.

13. The method according to claim 10, wherein the corrosion inhibitor comprises at least one homo- or copolymer which comprises at least 50% by weight of (meth)acrylic acid units.

14. The method according to claim 1, wherein the alkanesulfonic acid is introduced into the carbonatic rock formation as a mixture with amidosulfonic acid.

15. The method according to claim 7, wherein the alkanesulfonic acid is introduced into the carbonatic rock formation as a mixture with amidosulfonic acid.

16. The method according to claim 11, wherein the alkanesulfonic acid is introduced into the carbonatic rock formation as a mixture wit amidosulfonic acid.

17. The method according to claim 1, wherein the alkanesulfonic acid comprises methanesulfonic acid.

18. The method according to claim 7, wherein the alkanesulfonic acid comprises methanesulfonic acid.

19. The method according to claim 10, wherein the alkanesulfonic acid comprises methanesulfonic acid.

20. The method according to claim 14, wherein the alkanesulfonic acid comprises methanesulfonic acid.

* * * * *